(12) United States Patent
Meyer et al.

(10) Patent No.: US 7,563,317 B2
(45) Date of Patent: *Jul. 21, 2009

(54) SILICAS

(75) Inventors: Jürgen Meyer, Stockstadt (DE);
Stephanie Frahn, Goldbach (DE);
Manfred Ettlinger, Karlstein (DE)

(73) Assignee: Degussa AG, Düsseldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/524,366

(22) PCT Filed: Jul. 29, 2003

(86) PCT No.: PCT/EP03/08329

§ 371 (c)(1),
(2), (4) Date: Feb. 11, 2005

(87) PCT Pub. No.: WO2004/020531

PCT Pub. Date: Mar. 11, 2004

(65) Prior Publication Data

US 2005/0241531 A1    Nov. 3, 2005

(30) Foreign Application Priority Data

Aug. 28, 2002   (DE) ............................... 102 39 424

(51) Int. Cl.
*C04B 14/04*    (2006.01)
*C01B 33/12*    (2006.01)

(52) U.S. Cl. ...................... 106/481; 106/482; 106/485; 106/487; 106/490; 106/491; 423/335

(58) Field of Classification Search ................. 106/481, 106/482, 485, 487, 490, 491; 423/335
See application file for complete search history.

(56) References Cited

U.S. PATENT DOCUMENTS

| | | | |
|---|---|---|---|
| 5,665,156 A * | 9/1997 | Ettlinger et al. | 106/287.14 |
| 5,776,240 A | 7/1998 | Deller et al. | |
| 5,827,363 A | 10/1998 | Darsillo | |
| 5,959,005 A | 9/1999 | Hartmann et al. | |
| 6,020,419 A * | 2/2000 | Bock et al. | 524/590 |
| 6,193,795 B1 | 2/2001 | Nargiello | |
| 2002/0077388 A1 | 6/2002 | Meyer | |
| 2003/0108580 A1 * | 6/2003 | Hasenzahl et al. | 424/401 |
| 2006/0009545 A1 * | 1/2006 | Frahn et al. | 523/200 |
| 2006/0017038 A1 * | 1/2006 | Hasenzahl et al. | 252/2 |

FOREIGN PATENT DOCUMENTS

| | | | |
|---|---|---|---|
| DE | 10 2004 005 221 | * | 8/2005 |
| EP | 0 637 616 A1 | | 2/1995 |
| EP | 0 672 731 | * | 9/1995 |
| EP | 0 672 731 A1 | | 9/1995 |
| JP | 07-232912 | * | 9/1995 |
| WO | WO 01/64796 A1 | | 9/2001 |
| WO | WO 2004/020536 | * | 3/2004 |

* cited by examiner

*Primary Examiner*—Patricia L Hailey
(74) *Attorney, Agent, or Firm*—Robert G. Weilacher; Smith, Gambrell & Russell

(57) ABSTRACT

Silanised, structurally modified silicas, characterised by groups fixed on the surface, the groups being alkylsilyl ($SiC_nH_{2n+1}$, with n=2-18). They are produced in that pyrogenically produced silicas are treated with the silanising agent and structurally modified. They are used to improve scratch resistance in lacquers.

14 Claims, No Drawings

SILICAS

INTRODUCTION AND BACKGROUND

The invention relates to silanised, structurally modified, pyrogenically produced silicas, a process for the production thereof and their use.

Silanised silicas are used as thickeners, such as e.g. for water-thinnable lacquers and resins, such as e.g. epoxy resins.

From EP 0 672 731 B1, silanised, pyrogenically produced silicas are known, which are characterised in that the pyrogenically produced silicas are treated with a compound from the group $(RO)_3SiC_nH_{2n+1}$, wherein $n=10$ to 18 and R=short-chained alkyl radicals. For example, the pyrogenically produced silicas have been treated with the compound $(CH_3O)_3SiC_{16}H_{33}$ (hexadecyltrimethoxysilane) or with the compound $(CH_3O)_3SiC_{18}H_{37}$ (octadecyltrimethoxysilane).

The production of the silanised, pyrogenically produced silicas takes place in that the pyrogenically produced silicas are placed in a mixer, the silicas are sprayed, optionally first with water and then with the compound from the group $(RO)_3SiC_nH_{2n+1}$ while mixing intensively, mixed for a further 15 to 30 minutes and then tempered at a temperature of 100 to 160° C. for a period of 1 to 3 hours.

SUMMARY OF THE INVENTION

The invention provides silanised, structurally modified, pyrogenically produced silicas characterised by groups fixed on the surface, the groups being alkylsilyl ($SiC_nH_{2n+1}$, with $n=2-18$), preferably octylsilyl and/or hexadecylsilyl.

The silica according to the invention can have the following physico-chemical characteristics:

| | |
|---|---|
| BET-surface area m2/g: | 25-400 |
| Average size of the primary particles nm: | 5-50 |
| pH value: | 3-10 |
| Carbon content %: | 0.1-25 |
| DBP value %: | The DBP value is at least 10% lower than the DBP value of the corresponding silanised, non-structurally modified silica. With very marked structural modification, the structure can be broken down in such a way that the DBP value can no longer be determined. |

A silica produced by a high-temperature hydrolysis route from $SiCl_4+H_2$ and $O_2$ can be used as the pyrogenically produced silica.

In particular, a silica produced by high temperature hydrolysis having the following physico-chemical characteristics can be used:

TABLE 1

| | | AEROSIL 90 | AEROSIL 130 | AEROSIL 150 | AEROSIL 200 | AEROSIL 300 | AEROSIL 380 | AEROSIL OX 50 | AEROSIL TT 600 |
|---|---|---|---|---|---|---|---|---|---|
| Behaviour in respect of water | | | | | hydrophilic | | | | |
| Appearance | | | | | loose white powder | | | | |
| BET surface area[1]) | m²/g | 90 ± 15 | 130 ± 25 | 150 ± 15 | 200 ± 25 | 300 ± 30 | 380 ± 30 | 50 ± 15 | 200 ± 50 |
| Average size of the primary particles | nm | 20 | 16 | 14 | 12 | 7 | 7 | 40 | 40 |
| Tamped density[2]) | | | | | | | | | |
| standard material | g/l | ca. 80 | ca. 50 | ca. 50 | ca. 50 | ca. 50 | ca. 50 | ca. 130 | ca. 60 |
| compacted material (additive "V") | g/l | — | ca. 120 | ca. 120 | ca. 120 | ca. 120 | ca. 120 | — | — |
| Loss on drying[3]) (2 hours at 1000° C.) on leaving supplier's works | % | <1.0 | <1.5 | <0.5[9]) | <1.5 | <1.5 | <1.5 | <1.5 | <2.5 |
| Loss on ignition[4])[7]) (2 hours at 1000° C.) | % | <1 | <1 | <1 | <1 | <2 | <2.5 | <1 | <2.5 |
| pH value[5]) (in 4% aqueous dispersion) | | 3.6-4.5 | 3.6-4.3 | 3.6-4.3 | 3.6-4.3 | 3.6-4.3 | 3.6-4.3 | 3.8-4.8 | 3.6-4.5 |
| $SiO_2$[8]) | % | >99.8 | >99.8 | >99.8 | >99.8 | >99.8 | >99.8 | >99.8 | >99.8 |
| $Al_2O_3$[8]) | % | <0.05 | <0.05 | <0.05 | <0.05 | <0.05 | <0.05 | <0.08 | <0.05 |
| $Fe_2O_3$[8]) | % | <0.003 | <0.003 | <0.003 | <0.003 | <0.003 | <0.003 | <0.01 | <0.003 |
| $TiO_2$[8]) | % | <0.03 | <0.03 | <0.03 | <0.03 | <0.03 | <0.03 | <0.03 | <0.03 |
| HCl[8])[9]) | % | <0.025 | <0.025 | <0.025 | <0.025 | <0.025 | <0.025 | <0.025 | <0.025 |
| Sieving residue[6]) (acc. to Mocker, 45 μm) | % | <0.05 | <0.05 | <0.05 | <0.05 | <0.05 | <0.05 | <0.2 | <0.05 |

[1]) based on DIN 66131
[2]) based on DIN ISO 787/XI, JIS K 5101/18 (not sieved)
[3]) based on DIN ISO 787/II, ASTM D 280, JIS K 5101/21
[4]) based on DIN 55 921, ASTM D 1208, JIS K 5101/23
[5]) based on DIN ISO 787/IX, ASTM D 1208, JIS K 5101/24
[6]) based on DIN ISO 787/XVIII, JIS K 5101/20
[7]) based on the substance dried for 2 hours at 105° C.
[8]) based on the substance ignited for 2 hours at 1000° C.
[9]) HCl content is a component of the loss on ignition Pyrogenic silicas of this type are known. They are described, inter alia, in:

Winnacker-Küchler, Chemische Technologie, volume 3 (1983), 4th edition, page 77 and Ullmanns Encyklopädie der technischen Chemie, 4th edition (1982), volume 21, page 462.

The pyrogenically produced silicas are treated with a compound from the group $(RO)_3SiC_nH_{2n+1}$, wherein $n=2$ to 18 and R=alkyl, such as e.g. methyl, ethyl or similar.

In particular, the following compounds can be used:

Silane I $(CH_3O)_3SiC_{16}H_{33}$ (hexadecyltrimethoxysilane)

Silane II $(CH_3O)_3SiC_8H_{17}$ (octyltrimethoxysilane)

The silicas according to the invention can be produced in that the pyrogenically produced silicas are placed in a mixer, the silicas are sprayed, optionally first with water and then with the compound (organosilane) from the group $(RO)_3SiC_nH_{2n+1}$ while mixing intensively, mixed for a further 15 to 30 minutes and then tempered at a temperature of 100 to 160° C. for a period of 1 to 3 hours, structurally modified and/or optionally post-ground. A further tempering can optionally take place after the structural modification and/or post-grinding.

The structural modification can take place e.g. with a ball mill or a continuously operating ball mill. The post-grinding can take place e.g. using an air-jet mill or pin mill. The tempering can take place batchwise, e.g. in a drying cupboard, or continuously, e.g. in a fluidised bed. The tempering can take place under protective gas, e.g. nitrogen.

The water used can be acidified with an acid, e.g. hydrochloric acid, down to a pH value of 7 to 1.

The organosilane used can be dissolved in a solvent, such as e.g. ethanol.

The tempering can be performed in a protective gas atmosphere, such as e.g. under nitrogen.

The pyrogenically produced silicas according to the invention silanised with silane I have the physico-chemical characteristics listed in Table 2 before structural modification:

1 to 3 hours at 100 to 160° C. The tempering can also take place under protective gas, e.g. nitrogen.

The individual reaction conditions can be taken from Table 3.

The physico-chemical characteristics of the silanised silicas obtained are listed in Table 4.

TABLE 3

| Example | Aerosil | Silane | Silane quantity (g/100 g Aerosil) | Water quantity (g/100 g Aerosil) | Ethanol quantity (g/100 g Aerosil) | Tempering period (h) | Tempering temperature (° C.) |
|---|---|---|---|---|---|---|---|
| 1 | A 300 | Silane I | 1 | 0 | 9 | 2 | 120 |
| 2 | A 200 | Silane I | 2.5 | 0 | 0 | 2 | 140 |
| 3 | A 200 | Silane I | 20 | 5 | 0 | 2 | 140 |
| 4 | A 200 | Silane I | 10 | 2.5 | 0 | 2 | 140 |
| 5 | A 200 | Silane I | 5 | 1.25 | 0 | 2 | 140 |
| 6 | A 200 | Silane I | 2.5 | 1.25 | 0 | 2 | 140 |

TABLE 4

| Example | pH value | Tamped density (g/l) | C content (%) | Surface area (m²/g) | Loss on drying (%) | Loss on ignition (%) |
|---|---|---|---|---|---|---|
| 1 | 4.3 | 50 | 1.3 | 253 | 0.4 | 1.8 |
| 2 | 4.4 | 49 | 1.7 | 176 | 0.3 | 2.5 |
| 3 | 4.6 | 68 | 10.1 | 116 | 0.6 | 12.7 |
| 4 | 4.5 | 72 | 5.7 | 144 | 0.6 | 7.1 |
| 5 | 4.7 | 52 | 2.6 | 167 | 0.6 | 3.4 |
| 6 | 4.5 | 51 | 1.9 | 171 | 0.7 | 2.5 |

TABLE 2

| Educt | A 90 | A 130 | A 150 | A 200 | A 300 | A 380 | OX 50 | TT 600 |
|---|---|---|---|---|---|---|---|---|
| Average size of the primary particles [nm] | 20 | 16 | 14 | 12 | 7 | 7 | 40 | 40 |
| BET surface area [m²/g] | 40-90 | 60-130 | 75-150 | 100-200 | 150-300 | 200-380 | 20-50 | 100-250 |
| Tamped density [g/l] | 40-140 | 40-140 | 40-140 | 40-140 | 40-140 | 40-140 | 40-140 | 40-140 |
| Loss on drying [%] | <2 | <2 | <2 | <2 | <2 | <2 | <2 | <2 |
| Loss on ignition [%] | 0.1-10 | 0.1-10 | 0.1-10 | 0.5-15 | 0.5-20 | 0.5-25 | 0.1-10 | 0.1-20 |
| C content [%] | 0.1-10 | 0.1-10 | 0.1-10 | 0.5-15 | 0.5-20 | 0.1-25 | 0.1-10 | 0.5-20 |
| pH value | 3.5-5.5 | 3.5-5.5 | 3.5-5.5 | 3.5-5.5 | 3.5-5.5 | 3.5-5.5 | 3.5-5.5 | 3.5-5.5 |

The silanised, structurally modified, pyrogenically produced silicas according to the invention can be used to improve scratch resistance in lacquers.

DETAILED DESCRIPTION OF INVENTION

Examples

The pyrogenically produced silicas used have the physico-chemical characteristics listed in Table 1.

As organosilanes, the following compound with the general formula $(RO)_3SiC_nH_{2n+1}$ is used:

$(CH_3O)_3SiC_{16}H_{33}$     (Silane I)

The silica is placed in a mixer and sprayed first with water and then with organosilane, mixing intensively.

When the spraying is complete, stirring is continued for a further 15 to 30 minutes and then the mixture is tempered for Production and Physico-Chemical Properties of the Silicas According to the Invention Production of the Silicas According to the Invention:

The silicas, which can be produced as described in EP 0 672 731, are then structurally modified by mechanical action and possibly post-ground in a mill. A tempering can possibly take place after the structural modification and/or post-grinding.

The structural modification can take place e.g. with a ball mill or a continuously operating ball mill. The post-grinding can take place e.g. using an air-jet mill or pin mill. The tempering can take place batchwise, e.g. in a drying cupboard, or continuously, e.g. in a fluidised bed. The tempering can take place under protective gas, e.g. nitrogen.

TABLE 5

Overview of the production of the comparative silicas and the silicas according to the invention (Examples)

| Designation | Surface-fixed group | Structural modification | Post-grinding after structural modification | Tempering after post-grinding |
|---|---|---|---|---|
| Comparative silica 1 | Hexadecylsilyl | No | — | — |
| Comparative silica 2 | Octylsilyl | No | — | — |
| Silicas 1 | Hexadecylsilyl | Yes | No | No |
| Silicas 2 | Octylsilyl | Yes | Yes | No |
| Silicas 3 | Hexadecylsilyl | Yes | Yes | Yes |
| Silicas 4 | Octylsilyl | Yes | No | Yes |
| Silicas 5 | Octylsilyl | Yes | Yes | No |
| Silicas 6 | Hexadecylsilyl | Yes | Yes | No |
| Silicas 7 | Hexadecylsilyl | Yes | Yes | No |
| Silicas 8 | Hexadecylsilyl | Yes | No | No |
| Silicas 9 | Octylsilyl | Yes | Yes | No |
| Silicas 10 | Octylsilyl | Yes | No | No |
| Silicas 11 | Octylsilyl | Yes | Yes | No |
| Silicas 12 | Octylsilyl | Yes | No | No |

Formulation:

| | Parts by wt. |
|---|---|
| Millbase | |
| Acrylic resin, 50% in xylene/ethylbenzene 3:1 | 53.3 |
| Butyl acetate 98% | 6.7 |
| Xylene | 6.7 |
| Silica | 5.0 |
| Σ | 71.7 |
| Lacquer make-up | |
| Acrylic resin, 50% in xylene/ethylbenzene 3:1 | 1.1 |
| Xylene | 12.2 |
| Ethoxypropyl acetate | 1.5 |
| Butyl glycol acetate | 1.5 |
| Butyl acetate 98% | — |
| Aliphatic polyisocyanate, approx. 75% in 1-methoxypropyl-2-acetate/xylene 1:1 | 17.0 |
| Σ | 105.0 |
| Binder concentration: | 40% |
| Silica calculated on the basis of millbase (solids): | 18.8% |
| Silica calculated on the basis of lacquer (total): | 5.0% |
| Silica calculated on the basis of lacquer (solids): | 12.5% |

TABLE 6

Physico-chemical data of the silicas according to the invention (Examples) and the comparative silicas

| Designation | Tamped density [g/l] | Loss on drying [%] | Loss on ignition [%] | pH value | C content [%] | DBP adsorption [%] | BET specific surface area [m$^2$/g] |
|---|---|---|---|---|---|---|---|
| Comparative silica 1 | 57 | 0.5 | 1.8 | 4.6 | 1.2 | 302 | 195 |
| Comparative silica 2 | 51 | 0.6 | 6.8 | 5.3 | 5.4 | 263 | 175 |
| Silicas 1 | 137 | 0.7 | 1.9 | 4.9 | 1.3 | 217 | 193 |
| Silicas 2 | 112 | 0.7 | 7.0 | 5.8 | 5.5 | 145 | 175 |
| Silicas 3 | 118 | 0.7 | 2.3 | 5.1 | 1.3 | 228 | 176 |
| Silicas 4 | 163 | 0.9 | 6.7 | 5.3 | 5.4 | 134 | 176 |
| Silicas 5 | 114 | 0.5 | 7.1 | 6.0 | 5.4 | 142 | 175 |
| Silicas 6 | 113 | 1.3 | 2.2 | 5.1 | 1.4 | 221 | 193 |
| Silicas 7 | 123 | 0.7 | 2.6 | 6.0 | 1.4 | 208 | 197 |
| Silicas 9 | 146 | 1.1 | 2.3 | 5.8 | 1.4 | 182 | 195 |
| Silicas 9 | 240 | 0.8 | 6.7 | 4.8 | 5.3 | 87 | 169 |
| Silicas 10 | 322 | 0.3 | 6.9 | 6.0 | 5.3 | Could not be determined | 172 |
| Silicas 11 | 204 | 0.7 | 6.4 | 5.7 | 5.4 | 101 | 173 |
| Silicas 12 | 276 | 0.3 | 6.6 | 6.6 | 5.3 | Could not be determined | 168 |

Application Examples

Example 1

For the investigation of the improvement in scratch resistance, a conventional 2-component polyurethane lacquer was used. The formulation of the lacquer and its production, including application, are summarised below:

Production and Application of Lacquers

The binder is mixed with the solvents. Then, for the purpose of predispersion, the silica is incorporated into this mixture with the high-speed mixer (disk Ø 45 mm) and predispersed for 5 min at 2000 rpm. The mixture is dispersed in a laboratory pearl mill for 30 min at 2500 rpm and 60% pump capacity using glass beads (Ø approx. 1 mm). The millbase is tested with a grindometer, 25 μm, according to DIN ISO 1524. It must be smaller than 10 μm.

The conversion of the millbase to lacquer takes place in accordance with the formulation, the components being mixed at 2000 rpm with a vane agitator. The hardener is incorporated in the same way.

After adjusting the lacquers to spray viscosity in accordance with DIN 53411, the lacquers are applied to black lacquered metal sheets, e.g. DT 36 (from Q-Panel), by spray application (coat thickness about 40-50 μm). After spraying, the metal sheets are dried for 24 h at room temperature and then for 2 h in a drying oven at 70° C.

Scratch Tests:

The metal sheets are abraded with a quartz/water slurry (100 g water+1 g Marlon A 350, 0.25%+5 g Sikron F500) and with a $CaCO_3$/water mixture (100 g water+1 g Marlon A 350, 0.25%+5 g Millicarb BG) using an abrasion and washing resistance tester (Erichsen, brush with hog's bristles). The gloss before and 10 min after the abrading is determined with a reflectometer (20° irradiation angle).

Formulation:

|  | Parts by wt. |
|---|---|
| Millbase |  |
| Acrylic copolymer, mod. with synthetic fatty acids, 70% in n-butyl acetate | 61.0 |
| Butyl acetate 98% | 7.3 |
| Methoxypropyl acetate | 1.7 |
| Solvesso 100 | 2.0 |
| Xylene | 2.0 |
| Baysilon OL 17, 10% in xylene (silicone oil) | 0.7 |
| Silica | 5.0 |
| Σ | 79.7 |

TABLE 7

Summary of the properties of the liquid lacquers relevant in terms of lacquer technology, and of the applied and dried films.

|  | Comparative silica 1 | Silica 7 | Silica 8 | Reference without silica | Comparative silica 2 | Silica 9 | Silica 11 | Reference without silica |
|---|---|---|---|---|---|---|---|---|
| Grindometer value [μm] | <10 | <10 | <10 | <10 | <10 | <10 | <10 | / |
| Viscosity (millbase) [mPas] |  |  |  |  |  |  |  |  |
| 6 Rpm | 409 | 210 | 220 | / | 5670 | 935 | 832 | / |
| 60 Rpm | 407 | 210 | 212 | / | 1260 | 409 | 407 | / |
| Viscosity (lacquer + hardener) [mPas] |  |  |  |  |  |  |  |  |
| 6 rpm | 120 | 80 | 80 | 60 | 446 | 195 | 175 | 55 |
| 60 rpm | 113 | 82 | 82 | 61 | 194 | 146 | 144 | 64 |
| Flow | poor fine cracks | OK | OK | OK | Orange peel effect | OK | OK | OK |
| Scratch resistance |  |  |  |  |  |  |  |  |
| 20° reflectometer value before scratching | 81 | 89.5 | 89.1 | 91.3 | 38 | 85.5 | 85.3 | 91.7 |
| Haze before scratching | 101 | 9 | 12 | 2 | 423 | 18 | 19 | 2 |
| Black value My | 272 | 286 | 286 | 291 | 260 | 283 | 282 | 294 |
| 40 strokes with Sikron F 500 residual gloss [%] | 83.4 | 88.5 | 90.7 | 51.8 | / | 80.4 | 84.3 | 56.1 |

The silicas 7+8 and 9+11 according to the invention can be used in high concentrations without impairing the appearance of the lacquer surface owing to their substantially lower rheological efficiency compared with comparative silica 1+2. In addition, the silicas according to the invention display a substantial improvement in scratch resistance of the lacquer surface.

Example 2

In this example the influence of the structural modification was investigated on the basis of a high solids 2-component PU clear lacquer. The formulation of the lacquer and its production, including application and testing, are summarised below:

-continued

|  | Parts by wt. |
|---|---|
| Lacquer make-up (hardener) |  |
| Aliphatic polyisocyanate, 90% in n-butyl acetate | 22.3 |
| Butyl acetate 98% | 2.0 |
| Solvesso 100 | 1.0 |
| Σ | 105.0 |

| Binder concentration: | 62.8% |
|---|---|
| Silica calculated on the basis of millbase (solids): | 11.7% |

-continued

| | |
|---|---|
| Silica calculated on the basis of lacquer (total): | 5.0% |
| Silica calculated on the basis of lacquer (solids): | 8.0% |

Production and Application of the Lacquers

The binder is mixed with the solvents. Then, for the purpose of predispersion, the silica is incorporated into this mixture with the high-speed mixer (disk Ø 45 mm) and predispersed for 5 min at 2000 rpm. The mixture is dispersed in a laboratory pearl mill for 30 min at 2500 rpm and 60% pump capacity using glass beads (Ø approx. 1 mm). The millbase is tested with a grindometer, 25 μm, in accordance with DIN ISO 1524. It must be smaller than 10 μm.

The conversion of the millbase to lacquer takes place in accordance with the formulation, the components being mixed with a vane agitator at 2000 rpm. The hardener is incorporated in the same way.

After adjusting the lacquers to spray viscosity in accordance with DIN 53411, the lacquers are applied to black lacquered metal sheets, e.g. DT 36 (from Q-Panel), by spray application (coat thickness about 40-50 μm). After spraying, the metal sheets are dried for 24 h at room temperature and then for 2 h in a drying oven at 70° C.

Scratch Tests:

The metal sheets are abraded with a quartz/water slurry (100 g water+1 g Marlon A 350, 0.25%+5 g Sikron F500) using an abrasion and washing resistance tester (Erichsen, brush with hog's bristles). The gloss before and 10 min after the abrading is determined with a reflectometer (20° irradiation angle).

TABLE 8

Summary of the properties of the liquid lacquers relevant in terms of lacquer technology, and of the applied and dried films.

| | Comparative silica 1 | Silica 7 | Silica 8 | Reference without silica |
|---|---|---|---|---|
| Bulk density [g/l] | 50 | 146 | 123 | / |
| Grindometer value [μm] | <10 | <10 | <10 | / |
| Viscosity (millbase) [mPas] | | | | |
| 6 rpm | 767 | 376 | 376 | 205 |
| 60 rpm | 717 | 359 | 361 | 205 |
| Viscosity (lacquer + hardener) [mPas] | | | | |
| 6 rpm | 459 | 279 | 281 | 120 |
| 60 rpm | 399 | 272 | 274 | 120 |
| Flow | poor (fine "cracks") | OK | OK | OK |
| Scratch resistance | | | | |
| 20° reflectometer value before scratching | 82.3 | 86.5 | 86.3 | 88.2 |
| Haze before scratching | 3 | 4 | 4 | 2 |
| Black value My | 275 | 283 | 282 | 292 |
| 40 strokes with Sikron F 500 residual gloss [%] | 63.2 | 78.2 | 75.4 | 30.2 |

The silicas 7+8 according to the invention can be used in high concentrations without impairing the appearance of the lacquer surface owing to their substantially lower rheological efficiency compared with comparative silica 1. In addition, the silicas according to the invention display a substantial improvement in the scratch resistance of the lacquer surface.

Example 3

For the investigation of the improvement of the scratch resistance, a conventional 2-component polyurethane lacquer was used. The formulation of the lacquer and its production, including its application, are summarised below:

Formulation

| | Parts by wt. |
|---|---|
| Millbase | |
| Acrylic copolymer, mod. with synthetic fatty acids, 60% solution | 43.4 |
| Butyl acetate 98% | 17.8 |
| Xylene | 3.9 |
| Silica | 5.0 |
| Σ | 70.7 |
| Lacquer make-up | |
| Xylene | 11.3 |
| Ethoxypropyl acetate | 3.4 |
| Butyl glycol acetate | 1.6 |
| Aliphatic polyisocyanate, approx. 75% in 1-methoxypropyl-2-acetate/xylene 1:1 | 18.6 |
| Σ | 105.0 |

| | |
|---|---|
| Binder concentration: | 40% |
| Silica calculated on the basis of millbase (solids): | 19.2% |
| Silica calculated on the basis of lacquer (total): | 5.0% |
| Silica calculated on the basis of lacquer (solids): | 12.5% |

Production and Application of the Lacquers

The binder is mixed with the solvents. Then, for the purpose of predispersion, the silica is incorporated into this mixture with the high-speed mixer (disk Ø 45 mm) and predispersed for 5 min at 2000 rpm. The mixture is dispersed in a laboratory pearl mill for 30 min at 2500 rpm and 60% pump capacity using glass beads (Ø approx. 1 mm). The millbase is tested with a grindometer, 25 μm, in accordance with DIN ISO 1524. It must be smaller than 10 μm.

The conversion of the millbase to lacquer takes place in accordance with the formulation, the components being mixed with a vane agitator at 2000 rpm. The hardener is incorporated in the same way.

After adjusting the lacquers to spray viscosity in accordance with DIN 53411, the lacquers are applied to black lacquered metal sheets, e.g. DT 36 (from Q-Panel), by spray application (coat thickness about 40-50 μm). After spraying, the metal sheets are dried for 24 h at room temperature and then for 2 h in a drying oven at 70° C.

Scratch Tests:

The metal sheets are abraded with a quartz/water slurry (100 g water+1 g Marlon A 350, 0.25%+5 g Sikron F500) using an abrasion and washing resistance tester (Erichsen, brush with hog's bristles). The gloss before and 10 min after the abrading is determined with a reflectometer (20° irradiation angle).

TABLE 9

Summary of the properties of the liquid lacquers relevant in terms of lacquer technology, and of the applied and dried films.

|  | Comparative silica 1 | Silica 7 | Silica 8 | Reference without silica | Comparative silica 2 | Silica 9 | Silica 11 | Reference without silica |
|---|---|---|---|---|---|---|---|---|
| Grindometer value [μm] | <10 | <10 | <10 | / | <10 | <10 | <10 | / |
| Viscosity (millbase) [mPas] | | | | | | | | |
| 6 rpm | 409 | 210 | 220 | / | 5670 | 935 | 832 | / |
| 60 rpm | 407 | 210 | 212 | / | 1260 | 409 | 407 | / |
| Viscosity (lacquer + hardener) [mPas] | | | | | | | | |
| 6 rpm | 120 | 80 | 80 | 60 | 446 | 195 | 175 | 55 |
| 60 rpm | 113 | 82 | 82 | 61 | 194 | 146 | 144 | 64 |
| Flow | Poor fine cracks | OK | OK | OK | Orange-peel effect | OK | OK | OK |
| Scratch resistance | | | | | | | | |
| 20° reflectometer value before scratching | 81 | 89.5 | 89.1 | 91.3 | 38 | 85.5 | 85.3 | 91.7 |
| Haze before scratching | 101 | 9 | 12 | 2 | 423 | 18 | 19 | 2 |
| 40 strokes with Sikron F 500 Residual gloss [%] | 83.4 | 88.5 | 90.7 | 51.8 | / | 80.4 | 84.3 | 56.1 |

The silicas 7+8 and 9+10 according to the invention can be used in high concentrations without impairing the appearance of the lacquer surface owing to their substantially lower rheological efficiency compared with comparative silica 1 and 2. In addition, the silicas according to the invention display a substantial improvement in the scratch resistance of the lacquer surface.

Example 4

Direct comparison of the silicas according to the invention with a scratch-resistant lacquer according to DE 198 11 790 A1, in which AEROSIL R 972 is used to improve the scratch resistance.

|  | Prior art 1) | Silicas 2) according to the invention |
|---|---|---|
| Millbase | | |
| Desmophen A 2009/1 | | 190.2 |
| Methoxypropyl acetate: Solvesso 100 1:1 | | 36.8 |
| Silica | | 23.0 |
| Σ | | 250.0 |
| Lacquer make-up | | |
| Desmophen A YEP4-55A, contains AEROSIL R 972 | 96.0 | — |
| Millbase | — | 48.9 |
| Desmophen 2009/1 | — | 24.9 |
| OL 17, 10% in MPA | — | — |
| Modaflow 1% in MPA | — | — |
| MPA: Solvesso 100 1:1 | 11.6 | 33.8 |
| Butyl glycol acetate | 10.5 | 10.5 |
| Byketol OK | 7.5 | 7.5 |
| Byk 141 | 0.8 | 0.8 |

-continued

|  | Prior art 1) | Silicas 2) according to the invention |
|---|---|---|
| Addition of hardener | | |
| Desmodur N 3390 | 23.6 | 23.6 |
| Σ | 150.0 | 150.0 |

Production and Application of the Lacquers

1) Comparative silica 1 is incorporated into the binder in accordance with DE 198 11 790 A1 using a jet disperser.
2) The binder is mixed with the solvents. Then, for the purpose of predispersion, the silica is incorporated into this mixture with the high-speed mixer (disk Ø 45 mm) and predispersed for 5 mm at 2000 rpm. The mixture is dispersed in a laboratory pearl mill for 30 min at 2500 rpm and 60% pump capacity using glass beads (Ø approx. 1 mm). The millbase is tested with a grindometer, 25 μm, according to DIN ISO 1524. It must be smaller than 10 μm.

The conversion to lacquer of the millbases corresponding to 1) or 2) takes place in accordance with the formulation, the components being mixed at 2000 rpm with a vane agitator. The hardener is incorporated in the same way.

After adjusting the lacquers to spray viscosity in accordance with DIN 53411, the lacquers are applied to black lacquered metal sheets, e.g. DT 36 (from Q-Panel), by spray application (coat thickness about 40-50 μm). After spraying, the metal sheets are dried for 24 h at room temperature and then for 2 h in a drying oven at 70° C.

Scratch Tests:

The metal sheets are abraded with a $CaCO_3$/water slurry (100 g water+1 g Marlon A 350, 0.25%+5 g Millicarb $CaCO_3$) using an abrasion and washing resistance tester (Erichsen, brush with hog's bristles). The gloss before and 10 min after the abrading is determined with a reflectometer (20° irradiation angle).

TABLE 10

Summary of the properties of the liquid lacquers relevant in terms of lacquer technology, and of the applied and dried films.

|  | Prior art | Silica 7 | Reference |
|---|---|---|---|
| Grindometer value [μm] | <10 | <10 | / |
| Viscosity (millbase) [mPas] |  |  |  |
| 6 rpm | 58 | 30 | 30 |
| 60 rpm | 48 | 43 | 40 |
| Surface | Orange peel | OK | OK |
| 20° reflectometer value before scratching | 88.0 | 86.5 | 98.5 |
| 100 strokes with Millicarb Residual gloss [%] | 88.6 | 96.3 | 59.6 |

It is shown that a substantially better improvement in the residual gloss is achieved after a scratch stressing of the lacquer surface by using the silica according to the invention than with the prior art. In addition, owing to its low rheological efficiency, the silica according to the invention does not cause an orange-peel effect.

The invention claimed is:

1. Silanised, structurally modified, pyrogenically produced silicas,
    characterised by octylsilyl and/or hexadecylsilyl groups fixed to the surface, wherein structural modification is done by spraying pyrogenically produced silica optionally first with water and then with hexadecyltrimethoxysilane $(CH_3O)_3SiC_{16}H_{33}$ or octyltrimethoxysilane $(CH_3O)_3SiC_8H_{17}$, mixing intensively, mixing for a further 15 to 30 minutes and then tempering at a temperature of 100 to 160° C. for a period of 1 to 3 hours, then structurally modifying said silica by subjecting said silica to a ball mill to produce a silica with a DBP value of at least 10% lower than the DBP value of non-structurally modified silica.

2. Process for the production of the silanised, structurally modified, pyrogenically produced silicas according to claim 1,
    characterised in that a pyrogenically produced silica is placed in a mixer, the silica is sprayed, optionally first with water and then with the compound from the group $(RO)_3SiC_nH_{2n+1}$ while mixing intensively, mixed for a further 15 to 30 minutes and then tempered at a temperature of 100 to 160° C. for a period of 1 to 3 hours, structurally modified by ball milling and/or optionally post-grinding.

3. Process for the production of the silanised, structurally modified, pyrogenically produced silica according to claim 2, characterised in that an additional tempering of said silica is carried out.

4. Lacquer composition comprising a lacquer vehicle and the silanised, structurally modified, pyrogenically produced silica of claim 1.

5. A lacquer containing the silanised, structurally modified, pyrogenically produced silica of claim 1.

6. A surface having applied thereto a coating produced from the lacquer of claim 5.

7. The surface according to claim 6, which is metal.

8. A silanised, structurally modified, pyrogenically produced silica, said silica having been structurally modified by ball milling,
    and
    having the following physical chemical properties:

| BET surface area | 25-400 m²/g |
|---|---|
| Average size of primary particles | 5-50 nm |
| pH value | 3-10 |
| Carbon content | 0.1-25% |
| DBP value in % | at least 10% lower than the DBP value of a corresponding silianised, non-structurally modified silica, | wherein the pyrogenically produced silica has been treated with a compound selected from the group consisting of $(CH_3O)_3SiC_{16}H_{33}$ and $(CH_3O)_3SiC_8H_{17}$.

9. A process for the production of the silanised, structurally modified, pyrogenically produced silica according to claim 8, comprising placing the pyrogenically produced silica in a mixer, spraying the silica, optionally first with water, and then spraying with said compound while mixing intensively, mixing for a further 15 to 30 minutes and then tempering at a temperature of 100 to 160° C. for a period of 1 to 3 hours, structurally modifying by ball milling and and/or optionally post-grinding.

10. The process for the production of the silanised, structurally modified, pyrogenically produced silica according to claim 9, further comprising additionally tempering said silica.

11. The process according to claim 10, wherein tempering takes place in a drying cupboard or in a fluidized bed.

12. The process according to claim 11, wherein the tempering takes place under protective gas.

13. The process according to claim 9, further comprising post grinding said silica by using an air-jet mill or pin mill.

14. A lacquer containing the silanised, structurally modified, pyrogenically produced silica of claim 8.

* * * * *